Figure 1:
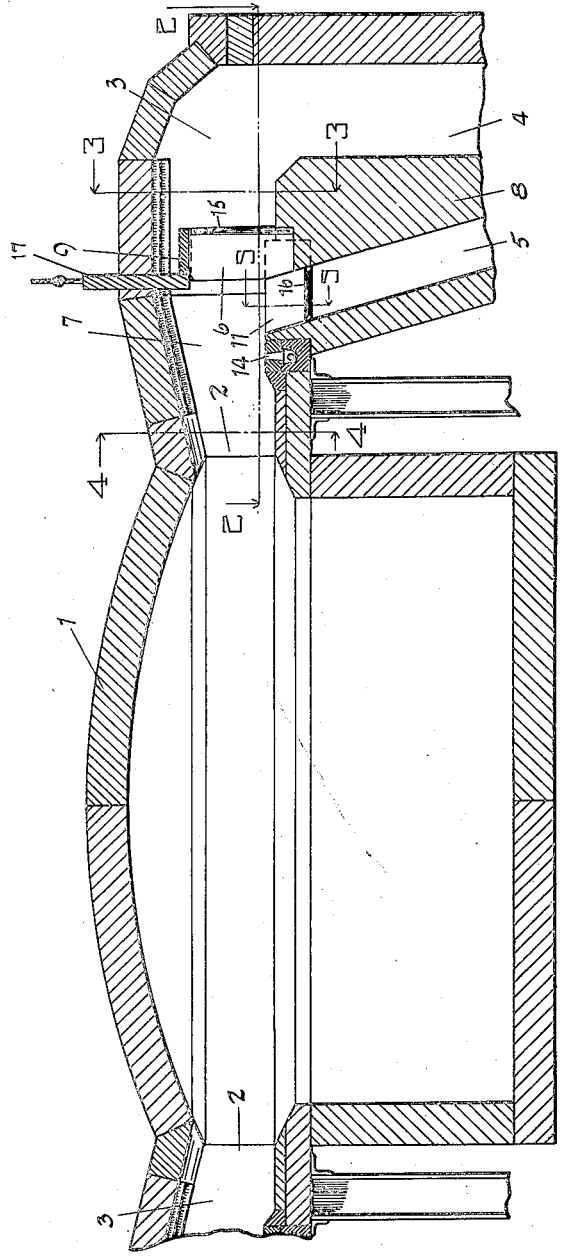

Patented July 5, 1927.

1,634,445

UNITED STATES PATENT OFFICE.

WILLIAM G. BERGMAN, OF POINT PLACE, OHIO.

BURNER FOR FURNACES.

Application filed November 27, 1925. Serial No. 71,528.

My invention has for its object to produce a burner for furnaces wherein the gases, that is, the fuel gas and air are thoroughly mixed to produce complete combustion. The invention provides a means for stratifying the air and the gas in vertical planes so that as it proceeds toward the port of the furnace in the vicinity of which ignition takes place there will be a uniform mixture of the fuel gas and the air and a high temperature and efficient flame will be projected from the port.

In furnaces commonly used for melting glass, the ports of opposite sides are alternately used as inlets for burning fuel and outlets for the products of combustion. The products of combustion are directed through checkerwork that in the succeeding period is used to heat the air, and also to heat the fuel gas where producer gas is used. In connection with each burner the gas enters the mixing chamber through a large port and the air enters another large port generally located on the outlet side of the mixing chamber with the result that the streams of gases do not comingle except at their border regions but remain in definite zones and flow through definite regions of the mixing chamber and a large part of the interior of the furnace located near the port through which they are emitted in passing from the mixing chamber. Consequently considerable fuel gas is drawn off into the checkerwork or stack and a low temperature inefficient flame is produced. Also considerable unburned carbon is discharged with the consequent loss of heat that should have been produced in the heating chamber of the furnace. By my invention a high temperature flame is produced and an efficient operation of the burners of the furnace is assured.

A further object of my invention is to place the fuel gas and air inlets of the mixing chamber in close proximity to the port through which the gases are emitted into the heating chamber or the furnace proper. This may be done by reason of the vertical stratification set up in the burners embodying my invention as it enables a marked reduction in the required length of the mixing chamber of the burner now commonly used. In the ordinary burner the air enters a large port and passes over the gas stream which moves about the same rate as the air stream, and in order to enable a moderate amount of mixture in the mixing chamber before delivery of the gas through the port, the chamber is necessarily made very long and since such furnaces have usually from eight to thirty burners, a large area is required in building the furnace. By my invention the chambers are greatly reduced in length which greatly reduces the cost of building the furnace and also reduces the necessary space required for the furnace.

The invention may be contained in burners for furnaces of different forms and which are used for different purposes and whether heated by producer gas or other artificial gas or heated by natural gas. To illustrate a practical application of the invention I have selected a burner containing my invention and shall describe it hereinafter. The burner selected as an example is shown in the accompanying drawings.

Figure 2:
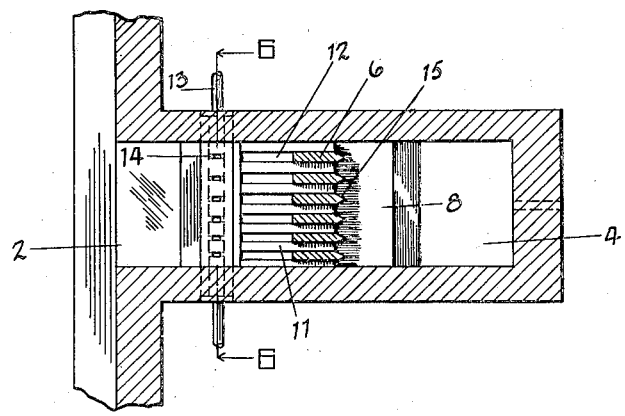
Figure 4:
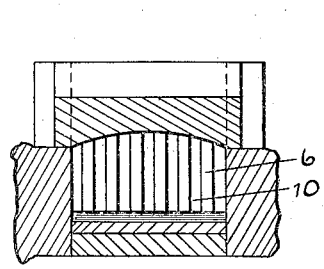
Figure 3:
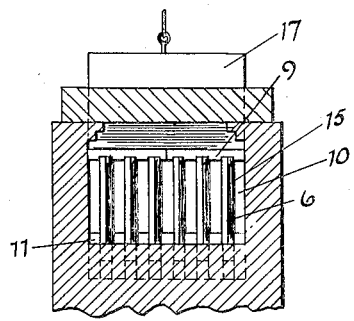
Figure 6:
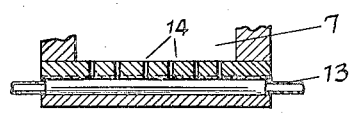
Figure 5:
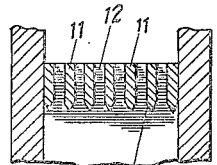

Figure 1 of the drawings illustrates a view of a section taken through the burner and across the furnace. Fig. 2 illustrates a view of a section taken on the plane of the line 2—2 indicated in Fig. 1. Fig. 3 is a view of a section taken on the plane of the line 3—3 indicated in Fig. 1. Fig. 4 is a view of a section taken on the plane of the line 4—4 indicated in Fig. 1. Fig. 5 is a view of a section taken on the plane of the line 5—5 indicated in Fig. 1. Fig. 6 is a view of a section taken on the plane of the line 6—6 indicated in Fig. 2.

The furnace 1 shown in Fig. 1 is provided with a plurality of ports 2 that extend along opposite sides of the furnace and at the desired height above the level of the glass or bath that is melted in the furnace. Associated with each port is a burner 3 through which the elements of combustible fuel mixture pass and in which the elements are mixed in advance of their ignition. The ports 2 also form outlets for the products of combustion which are drawn through the passage ways of the air and gas during certain periods of the operation of the furnace in order to heat the passage ways so that during the subsequent periods the fuel gas and air or air alone may be heated by the heat stored in the walls of the passage ways during the preceding period. As is well known in this art, the passage ways usually lead to checkerwork of brick which increases the surface area for the absorption of the heat during one period and the discharge of the heat during the subsequent period. In the particular construction shown, the air is admitted to the burner 3 through the passage way 4 while fuel gas, such as the producer gas is admitted through the passage way 5.

The burner 3 has preferably a wall in which is located a plurality of ports that divide the air into definite streams created by the suction or draft of the stack or other draft producing means. In the form of construction shown, the wall is formed of a plurality of slabs 6 that are located in parallel and spaced relation to form passage ways and oblong inlet ports of the mixing chamber 7. The slabs 6 may be mounted on a suitable pier or wall 8 and if desired tied together at the top by means of the slab or slabs 9. A space may be left between the slab 9 and the top of the burner to permit the entrance of an oblong stream of air into the mixing chamber 7 of the burner, the major axis of the cross section of which is located substantially in a horizontal plane, which, however, is penetrated by the streams of the fuel gas in the construction shown in the drawings as hereinafter described.

The burner is also preferably provided with a wall having a plurality of ports through which the fuel gas enters the mixing chamber between the streams or section or sheets, of air streams that are produced by the ports 10 that are formed by the slabs 6. The burner is preferably provided with a wall that is formed of a plurality of slabs 11 that are disposed in spaced and parallel relation so as to form the ports 12 that are located in line, with reference to the direction of the movement of the gases through the burner, with the slabs 6 that form the ports 10 which are in turn located in line with the slabs 11. The slabs 11 form oblong ports of the mixing chamber 7 through which streams of the fuel gas will pass upward and between the streams of air. The movement of the gas will be sufficient to cause it to penetrate to a more or less extent the air stream that passes over the slabs 9 since the ports 12 are located in line with the slabs 6 which forms a means of sheltering the stream of gas from the current of the streams of the air and enables this upward movement due to the impetus produced by the escape of the fuel gas from the narrow apertures or openings formed by the ports 12 into the larger area of the cross section of the mixing chamber 7.

If desired the inlet above the slabs 9 may be closed. Preferably, this is done by the gate 17 when air enters the mixing chamber to force the air through the other ports but is opened when the products of combustion pass out through the burner to increase the area of the outgoing passageways from the furnace. This increases the draft on the burners on the other side of the furnace. The gates 17 may thus be raised first on one side of the furnace and then on the other.

In constructing the walls or in forming the ports for the elements of the combustible fuel mixture, the edges of the slabs 6 and 11 are rounded or the corners are beveled as shown at 15 and 16, where the gas, that is, the air and fuel gas first strike or enter between the slabs to reduce local or eddy currents along the inner edges of the slabs. The ends of the slabs 6 and 11 are so placed as to overlap although the slabs extend at right angles to each other. This spaces each set of slabs and locates the slabs of each set in parallel and spaced relation and so that the ports formed by the one set of slabs are located in line with the slabs of the other set and the element of the combustible fuel mixture passing between each set of slabs is protected from the current of the other element of the combustible fuel mixture by the slabs that form the ports through which said other element enters. This produces an exceedingly efficient mixing means for mixing the fuel gas with the air which produces an exceedingly efficient burner. Also by reason of the thoroughness with which the mixing of the gas may be produced in a small space, the mixing chambers now commonly used may be greatly shortened with the result that the burner may be greatly shortened. Also the inlet port of the elements of the combustible mixture may be located closer to the outlet port of the gases into the body of the furnace. This reduces the cost of building and maintenance of the furnaces.

In the burners commonly used in the art, the air is admitted through a large port located at the outer end of the burner while the fuel gas, such as producer gas is admitted through another large port located beneath the stream of air with the result that the streams of air and gas move together, the gas stream occupying the lower part or half of the burner chamber, while the air stream occupies the upper half or part of the chamber and they are emitted through the inlet port of the furnace proper still occupying and maintaining largely their definite zones or regions as they pass across the furnace there being but a slight mixture of the gases at the border regions or zones of the two pronounced streams of gases. This results in the flow of gas across the furnace without thorough combustion and with the result that a large number of the heat units that might have been produced are lost and pass into the stack. By my invention the thorough mixture that is produced within the short length of the moving air stream causes a thorough mixture and a resultant substantially perfect combustion.

If desired inlets for artificial gas other than producer gas or natural gas may be provided in proximity to the ports 12 and so that the streams of the said gas may be emitted into the mixing chamber 7 and between the streams of air that pass into the mixing chamber through the ports 10. Thus artificial gas may be directed through the pipe 13 into the burner 3 and into the mixing chamber 7 through the ports 14. The streams of natural or artificial gas other than producer gas will thus penetrate between the streams of air which will be ignited at or near the ports 2. Natural gas, flue gas, coke oven gas and water gas may be directed through the auxiliary gas inlet. Such gases usually have relatively considerable pressure, such as 8 to 16 ozs. which enables them to penetrate between the stratified currents of air that enter through ports 10 although the burner is separated from the slabs that form the ports 10 by the length of the ports 12.

I claim:

1. In a burner for furnaces, a combustion chamber and a gas mixing chamber, the gas mixing chamber having a mouth through which the gas mixing chamber communicates with the combustion chamber, the wall of the mixing chamber having a plurality of ports for admitting streams of air into the mixing chamber to form air streams located between planes that extend vertically and towards the mouth of the mixing chamber, and means for directing streams of gas between the layers of air streams.

2. In a burner for furnaces, a combustion chamber and a gas mixing chamber, the gas mixing chamber having a mouth through which the gas mixing chamber communicates with the combustion chamber, a wall having a plurality of air ports for admitting streams of air to the mixing chamber and forming a plurality of vertically extending layers of moving air streams located between planes that extend vertically and towards the mouth of the mixing chamber, the wall of the mixing chamber having a plurality of ports for admitting streams of fuel gas into the mixing chamber and between the streams of air produced by the air ports to form a vertically stratified arrangement extending towards the mouth of the mixing chamber and consisting of alternate layers of gas and air that move through the mixing chamber and towards the combustion chamber.

3. In a burner for furnaces, a combustion chamber and a gas mixing chamber, a wall of the mixing chamber having a plurality of oblong air ports for admitting streams of air to the mixing chamber and forming vertically disposed layers of moving air streams and a second wall of the mixing chamber having a plurality of oblong fuel gas ports for directing fuel gas into the mixing chamber and between the streams of air, the major lengths of the said ports located in substantially parallel vertical planes that extend in the direction of the combustion chamber to form a stratified arrangement of streams of gas and air as they move through the gas mixing chamber to the combustion chamber the said planes through the centers of the gas ports being located in spaced relation with respect to the planes passing through the centers of the air ports.

4. In a burner for furnaces, a combustion chamber and a gas mixing chamber, the wall of the mixing chamber having a plurality of oblong air ports for admitting streams of air to the mixing chamber and forming vertically disposed layers of moving air streams, the mixing chamber having a second wall located substantially at right angles to the first named wall and having a plurality of oblong fuel gas ports for directing fuel gas into the mixing chamber and between the streams of air.

5. In a burner for furnaces, a mixing chamber, a wall having a plurality of ports for one of the elements of a combustible fuel mixture for admitting streams of the said element to the mixing chamber, a wall having a plurality of ports for admitting the other element of a combustible fuel mixture to the mixing chamber between the streams of the first named element of a combustible fuel mixture produced by the first named ports, the said ports being located in planes at an angle to each other.

6. In a burner for furnaces, a mixing chamber, a wall having a plurality of oblong ports for admitting streams of one of the elements of a combustible fuel mixture to the mixing chamber and means for directing another element of a combustible fuel mixture to the mixing chamber in the direction of the major dimension of the said ports and between the streams of the first named element.

7. In a burner for furnaces, a mixing chamber, a wall having a plurality of oblong ports for admitting streams of one of the elements of a combustible mixture to the mixing chamber, a wall having a plurality of oblong ports for admitting the other of the elements of the combustible fuel mixture between the streams of the first named element, the greater dimensions of the said ports being located in planes that are parallel to each other.

8. In a burner for furnaces, a mixing chamber, a wall having a plurality of oblong ports for admitting streams of one of the elements of a combustible mixture to the mixing chamber, a wall having a plurality of oblong ports for admitting the other of the elements of the combustible fuel mixture between the streams of the first named element, the greater dimensions of the said ports being located in planes that are parallel to each other, the planes of the said ports being located at an angle to each other.

9. In a burner for furnaces, a mixing chamber, a wall having a plurality of oblong ports for admitting streams of one of the elements of a combustible mixture to the mixing chamber, a wall having a plurality of oblong ports for admitting the other of the elements of the combustible fuel mixture between the streams of the first named element, the greater dimensions of the said ports being located in planes that are parallel to each other, the planes of the said ports being located at right angles to each other.

10. In a burner for furnaces, a mixing chamber, a wall having a plurality of air ports for admitting streams of air to the mixing chamber, a means for directing streams of a fuel gas into the chamber and between the streams of air produced by the air ports, a gate for closing and opening a space above the wall for restricting the inlet area of the burner and for increasing the outlet area of the burner when products of combustion are exhausted from the furnace.

In testimony whereof I have hereunto signed my name to this specification.

WILLIAM G. BERGMAN.